US005751122A

United States Patent [19]
Park

[11] Patent Number: 5,751,122
[45] Date of Patent: May 12, 1998

[54] DIGITAL CONVERGENCE CORRECTION SYSTEM

[75] Inventor: Hanee Park, Seoul, Rep. of Korea

[73] Assignee: LG Electronics Inc., Seoul, Rep. of Korea

[21] Appl. No.: 583,976

[22] Filed: Jan. 11, 1996

[30] Foreign Application Priority Data

Jan. 10, 1995 [KR] Rep. of Korea .................. 1995/368

[51] Int. Cl.[6] .............................. H01J 29/62; H04N 3/22; H04N 9/28
[52] U.S. Cl. .................... 315/368.16; 348/745; 348/807
[58] Field of Search .................. 315/368.16; 348/745, 348/807

[56] References Cited

U.S. PATENT DOCUMENTS 5,382,984  1/1995  Tsujihara et al. ................ 348/745

Primary Examiner—Gregory C. Issing
Attorney, Agent, or Firm—John P. White

[57] ABSTRACT

Digital convergence correction system for correcting misconvergence on a screen of a multi-mode projection television, including a first memory part for storing adjustment point data for every mode of multi-modes, a second memory part for storing convergence correction data in accordance with the adjustment point data, a control part for producing the convergence correction data using the adjustment point data stored in the first memory part for writing the convergence correction data on the second memory part and outputting the convergence correction data stored in the second memory part, and a time sharing processing unit for controlling the control part to share time in producing the convergence correction data and renewing convergence correction data in the second memory part and outputting the convergence correction data stored already in the second memory part for preventing overlap of the producing and storing time and the outputting time.

7 Claims, 4 Drawing Sheets

F I G.3
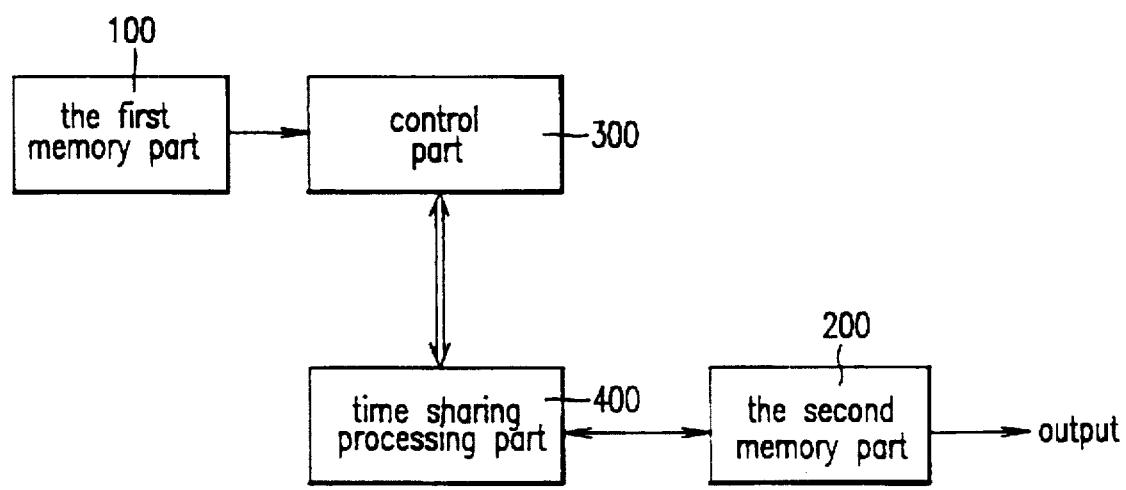

DIGITAL CONVERGENCE CORRECTION SYSTEM

BACKGROUND OF THE INVENTION

The present invention relates to a digital convergence correction system for correcting misconvergence on a screen of a multi-mode projection television.

In general, an image in the multi-mode projection television should pass through a convergence correction process for converging R, G, and B electron beams onto an optical system in projecting and displaying three color signals of the R, G, and B electron beams onto a screen as an image.

FIG. 1 is a block diagram of a conventional digital convergence correction system. A central processing unit (CPU) 1 reads-in data of adjustment points from electrically erasable and programmable read only memory (EEPROM) 2, interpolates the data for the entire screen, and writes them on a static random access memory(SRAM) 3. Then, upon receiving a signal for adjusting the image from a remote controller 4, the CPU 4 moves a cursor to a point on the screen where a user wants to correct the image, and vertically/horizontally increases /decreases the data of the adjustment point on the screen as necessary, and writes the data on the SRAM 3. Different from the EEPROM 2, the SRAM 3 stores data for the entire screen (e.g in case of an NTSC system, data as much as 16 (a number of horizontal adjustment points)×262.5 (a number of lines for one vertical field).

When the user moves the cursor by means of the remote controller 4 to a point between the lattice points (hereinafter called as adjustment points) of the test pattern shown in FIG. 2, selects a color to be corrected for the point, and adjusts data of the color in up and down, and right and left directions, signals corresponding to key adjustment are stored in the CPU 1.

Since the EEPROM 2 only has in storage of data on the adjustment points of the test pattern shown in FIG. 2, upon turning-on the set, the CPU 1 reads-in the data on the adjustment points, and writes the data into the SRAM 3.

And, on receiving a horizontal blanking signal MBLK, a PLL(phase locked loop) unit 5 oscillates to produce a master clock MCLK required for the system, and applies the master clock to an address generator 6. Then, the address generator 6 produces addresses for reading the data from the SRAM 3.

And, a test pattern generator 7 decodes the address produced from the address generator 6, generates the test pattern and the cursor required for the adjustment as shown in FIG. 2, and applies them to a video unit(not shown).

On receiving the data from the SRAM 3, a data converter 8 converts the data into a convergence correction data having bits suitable for a digital/analog converter 9 wherein the data converted into an analogous data, which is then waveform shaped through a low pass filter LPF1. A signal of the adjustment point data having been waveform shaped through the low pass filter LPF1 is amplified to a predetermined level via an amplifier AMP1, and applied to a convergence yoke CY1. Consequently, a change of magnetic field due to change of the current flowing through the convergence yoke CY1 influences each of the R, G and B electron beams to align the convergences on the screen.

When the CPU 1 reads, or writes the addresses generated from the address generator 6 in, or on the SRAM 3, a switch SW1 is turned off to prevent the addresses of the address generator 6 from being transmitted to the SRAM 3 for preventing collision between the addresses, and when the CPU 1 does not read or write, the switch SW1 is turned on to allow the addresses of the address generator 6 transmitted to the SRAM 3. The address output ports of the CPU 1 and the input ports of the SRAM 3 are connected in tri-state.

However, in the conventional convergence correction system, though the convergence correction data corresponding to deflected scanning position should be always applied from the SRAM 3, since the CPU turns off the switch at the time of the convergence correction, applying addresses from the CPU to the SRAM, but not allowing the application of the addresses of the address generator to the SRAM, the conventional convergence correction system has a problem in that the convergence correction data can not be applied properly at the moment of correction.

Moreover, since the conventional convergence correction system is only operative for the modes taken into account at the time of mode design, should necessity for any new modes arises, the address generator and the test pattern generator must be redesigned, which causes an increase in the production cost.

SUMMARY OF THE INVENTION

In an effort to solve the above-mentioned problems, the present invention encompasses an improved digital convergence correction system.

It is an object of the present invention to provide a digital convergence correction system in which a central processing unit(CPU) employs a time sharing system in using addresses of memory parts and data bus at correction of convergence in order not to disturb the present convergence.

It is another object of the present invention to provide a digital convergence correction system in which addresses and a test pattern relevant to the present mode can be generated even if a new mode is introduced.

In order to achieve the above object, a digital convergence correction system of the present invention includes, a first memory part for storing adjustment point data for every mode of multi-modes, a second memory part for storing convergence correction data in accordance with the adjustment point data, a control part for producing the convergence correction data using the adjustment point data stored in the first memory part for writing the convergence correction data on the second memory part and outputting the convergence correction data stored in the second memory part, and a time sharing processing unit for controlling the control part to share time in producing the convergence correction data and renewing convergence correction data in the second memory part and outputting the convergence correction data stored already in the second memory part for preventing overlap of the producing and storing time and the outputting time.

BRIEF DESCRIPTION OF THE DRAWINGS

The above objects and other advantages of the present invention will become more apparent upon consideration of presently preferred embodiments of the present invention with reference to the attached drawings in which:

FIG. 3 is a block diagram of a digital convergence correction system in accordance with a preferred embodiment of the present invention;

DETAILED DESCRIPTION OF THE PREFERRED EMBODIMENTS

Preferred embodiments of the present invention will now be discussed in detail with reference to the accompanying drawings.

Figure 1:
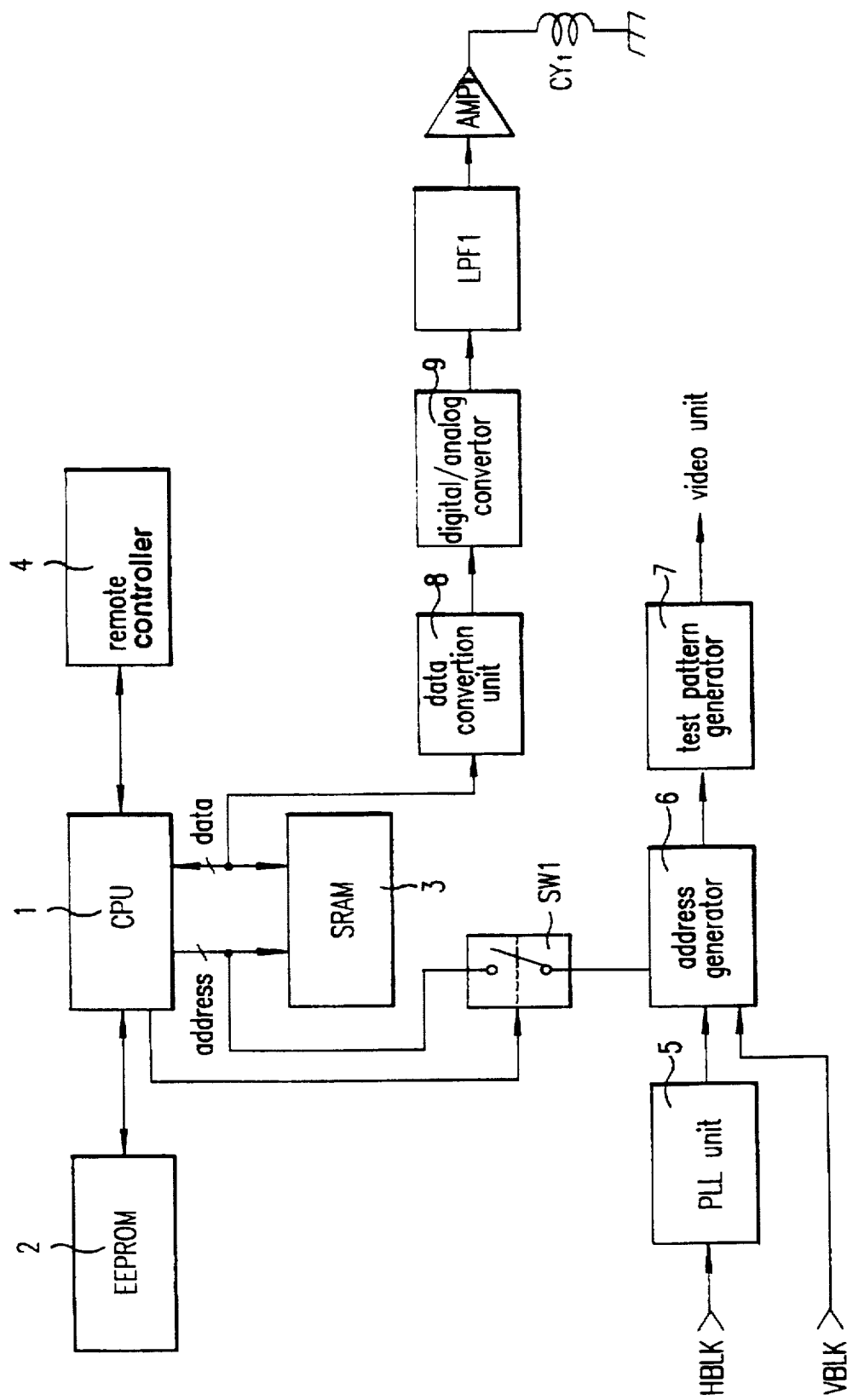
FIG. 1 is a block diagram of a conventional convergence correction system.
Figure 2:
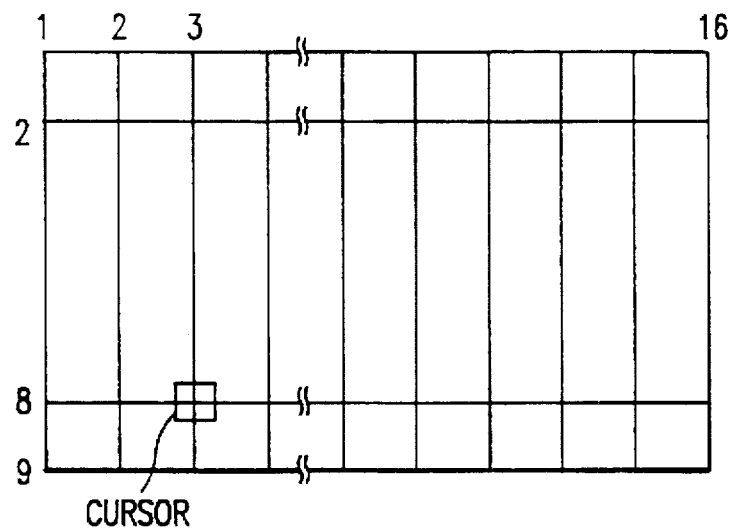
FIG. 2 depicts a test pattern for convergence correction in FIG. 1.
Figure 4:
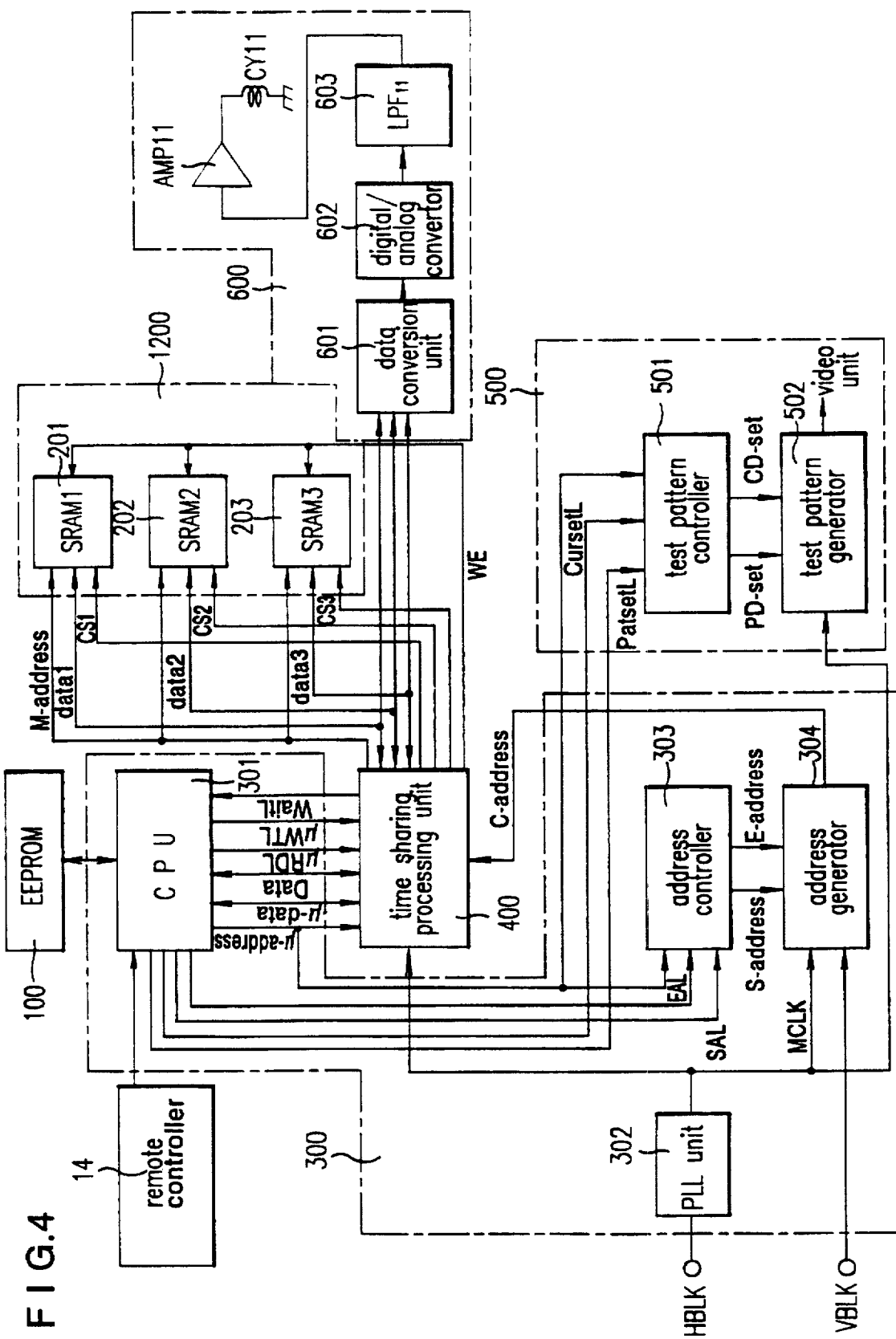
FIG. 4 Is a detail block diagram of a digital convergence correction system in accordance with a preferred embodiment of the present invention; and, FIG. 5 is a timing chart showing operation of different parts of the inventive digital convergence correction system in FIG. 4.
Figure 5:
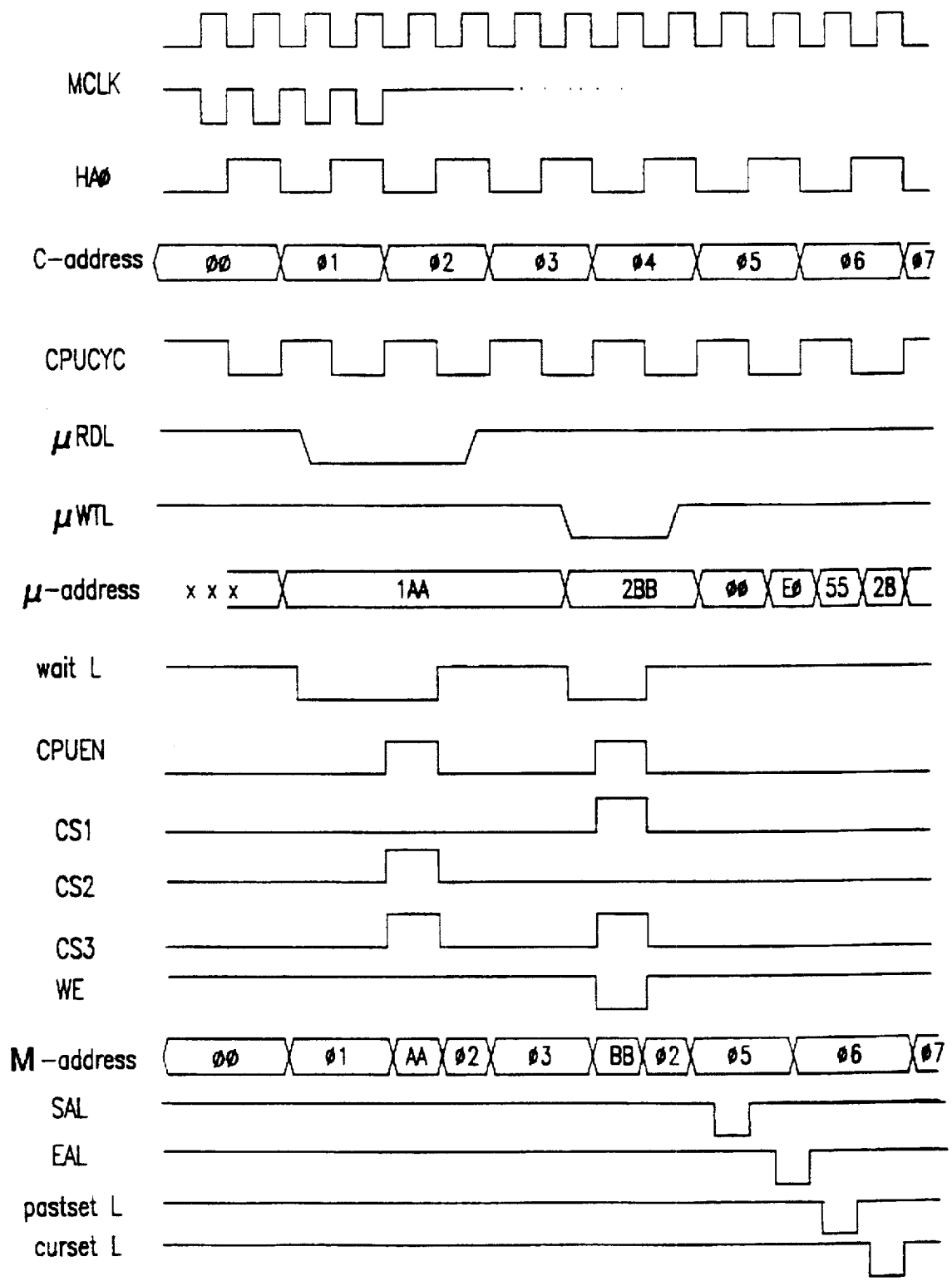

FIGS. 3 and 4 are block diagrams of a digital convergence correction systems in accordance with a preferred embodiment of the present invention, and FIG. 5 is a timing chart showing operation of different parts of the inventive digital convergence correction system of FIG. 4.

First, referring to FIG. 3, the digital convergence correction system of the present invention includes, in view of blocks, a first memory part 100 for storing adjustment point data on every mode of multi-modes, a second memory part 200 for storing convergence correction data in accordance with the adjustment point data, a control part 30 for producing the convergence correction data using the adjustment point data stored in the first memory part 100 for writing the convergence correction data on the second memory part 200 and outputting the convergence correction data stored in the second memory part 200, and a time sharing processing unit 400 for controlling the control part 300 to share time in producing the convergence correction data and renewing convergence correction data in the second memory part 200 and outputting the convergence correction data already stored in the second memory part 200 for preventing overlap of the producing and storing time and the outputting time.

Referring to a detail block diagram shown in FIG. 4, the digital convergence correction system of the present invention includes a second memory part 200 having SRAM1–SRAM3 201–203 connected in parallel each storing data different from one another for being read-in or written on by a time-sharing processing unit 400, a time-sharing processing unit 400 for controlling a CPU 301, on reception of an external signal from a remote controller 14, to be operative sharing the times for reading-in and writing on the second memory part 200 and transferring convergence correction data from the second memory part 200 to a data conversion part 601, and an address controller 303 for setting an address section to an address generator 304 according to determination of the CPU 301 in that in which part of the second memory part 200 the data of a mode to be actually entered into the set and displayed at the present time in case the data stored in the second memory part 200 has multi-mode data. The inventive system further includes a test pattern controller 501 for setting multi-mode data for generating test patterns and cursors of a test pattern generator 502 to the test pattern generator 502.

And, the first memory part 100 includes an electrically erasable and programmable ROM in storage of multi-mode adjustment point data, and the second memory part 200 preferably includes a plurality of static RAMs(SRAMs) connected in parallel.

Herein, explanation on parts identical to the parts in the conventional system will be omitted.

The CPU 301 of the present invention reads-in data only on adjustment points from the EEPROM 100, computes data for the entire screen through interpolation, and writes the computed data into the second memory part 200. And, the PLL unit 302 receives a horizontal blanking signal MBLK to produce a master clock MCLK required for the system, and the address generator 304 produces an address C-address for accessing the second memory part 200 for convergence correction data.

The time-sharing processing unit 400 controls the CPU 301 to be operative on receiving an external signal from the remote controller 14, sharing the time for reading-in/writing-on the second memory part 200 and the time for accessing the second memory part 200 for convergence data and applying the convergence data to the data conversion unit 601.

That is, of the HA0 signal obtained by frequency demultiplying the master clock MCLK shown in FIG. 4 by once, in sections where the HA0 signal is 1, the second memory part 200 is accessed for the convergence correction data, and in sections where the HA0 signal is 0, the CPU 301 read-in/write-on the second memory part 200. The C-address is produced by this time sharing.

A signal CPUCYC shown in FIG. 4, being an inverted signal of the HA0 signal reads-in or writes-on the second memory part 200 in response to a read signal µRDL and a write signal µWTL from the CPU 301 respectively, when the CPUCYC is at 1.

The following is detailed description on the operation of CPU 301 of reading-in/writing-on the second memory part 200.

When the CPU 301 produces an address µ-address to 1 AA while making the read signal µRDL zero to read-in from the SRAM1 201, CPU 301 decodes significant four-bits of an address M-address to select SRAM1 201, and puts a signal WaitL into an active state. The signal WaitL is a low active signal (0), and all the signals having L as the last code are low active signals in FIG. 4.

The signal WaitL keeps the CPU 301 in a wait state until the time-sharing processing unit 400 processes the read signal µRDL and write signal µWTL.

The time-sharing processing unit 400 checks the signal CPUCYC for producing a CPUEN signal and executing the required order when the CPUCYS is at high H. The signal CPUEN is produced when µRDL and µWTL are in an active state, and CPUCYC is active, too.

At a section where the above CPUEN attains a high level, chip selection signals cs2 and cs3 of SRAM2 202 and SRAM3 203 are disabled, and by producing M-address for accessing SRAM1 201 to AA, data corresponding to the address AA which in received from SRAM1 201 is transmitted to CPU 301 via µ-data line.

The write operation of CPU 301 is carried out in the same manner as above, and e.g., when certain data is written into SRAM2 202, CPU 301 takes the signal µWTL zero, producing µ-address 2BB and µ-data, the signal WaitL is activated right after that. The time-sharing processing unit 400 checks out the signal CPUCYC, and by producing the signal CPUEN at a section where CPUCYC is 1, only the chip selection signal cs2 of the SRAM2 202 and a write enable signal WE are activated to write µ-data into address BB of the SRAM2 202.

The chip selection signal CB2 of the SRAM2 202 is activated by decoding significant four-bits of the M-address, and the WaitL is disabled at a section where CPUEN is disabled. That is, the WaitL is activated by µRDL or µWTL, and disabled by CPUEN.

The address controller 303 receives by CPU 301 in which portion of the second memory part 200 the data corresponding to the mode that is actually inputted to the set is, and sets the address section to the address generator 304.

When CPU 301 produces M-address of 000 and SAL of 0, a start address latch signal, the address controller 303 latches an address of 00, neglecting the significant four-bits to transmit S-address (Start-Address) of 00 to the address generator 304.

Besides, when CPU 301 produces M-address of 0E0 and EAL of 0, an end address latch signal, the address controller 303 latches an address of E0, without regard to the significant four-bits to transmit E-address (End-Address) of E0 to the address generator 304, and the address generator 304 addresses 00 to E0.

In the test pattern controller 501, since the same number of addresses are generated as horizontal address by PLL unit 15 at the multi-mode, and the horizontal number of lines are changed vertically, the test pattern generator 502 consists of a loadable counter, and pattern generation loaded data PDset and cursor generation loaded data CDset are produced by latching the test pattern generator 502 as signals PatsetL and CursetL that are loading loaded data values of the counter by means of a loaded data value, i.e. μ-address value in the same manner as that of setting S-address or E-address. PDset and CDset are then inputted to the test pattern generator 502.

In the test pattern generator 502, counting is performed by the loaded data for a predetermined period of time, and data corresponding to a test pattern and a cursor required for convergence correction, is generated.

The data conversion unit 601 converts the convergence correction data into data that can be in agreement to a format of the digital/analog convertor 602, which convergence correction data being obtained by applying the M-address received from the time-sharing processing unit 400, and the digital/analog convertor 602 converts the above data into an analogue signal.

The output of the digital/analog convertor 602 is shaped in wave through LPF11 603, and is then amplified by the amplifier AMP11 to flow to the convergence yoke CY11 as correction current thereby performing convergence correction in the screen.

The time-sharing conditions of the time-sharing processing unit 400 depend on the frequency of HA0, CPUCYC. Accessing data in parallel from a plurality of SRAMs rather than accessing data from a single SRAM at a predetermined period of time relatively makes larger the frequency of HA0, and ensures the access time to SRAM unit as much as that, thereby securing satisfactory time for time-division. Therefore, the present invention is designed to employ at least three SRAMs connected in parallel for processing correction data at the same time in parallel.

As described above, the digital convergence correction system of the present invention, including a first memory part for storing adjustment point data, a second memory part for storing convergence correction data for the entire screen, and a CPU for reading the data out of the first memory and producing data of convergence correction for the entire screen to write the same into the second memory and control the whole system. The inventive system further includes a time-division processing unit for dividing the time for reading data out of/writing data into the second memory according to the control of CPU and the time for accessing the data of convergence correction from the second memory to produce the data, a phase locked loop (PLL) unit producing a master clock required for the system by means of a horizontal blanking signal, and an address generator generating addresses for accessing the data of convergence correction from the second memory by means of the master clock produced from PLL unit. In addition, the inventive system includes an address controller controlling the generation of each address of the address generator to correspond to the correct mode by the control of CPU at the multi-mode, a test pattern generator generating a test pattern for convergence correction in response to the master clock outputted from PLL unit, and a test pattern controller setting to the test pattern generator the data for producing a cursor and a test pattern of the test pattern generator by the control of CPU, which can control the quantity of electric current flowing to the convergence yoke by data of convergence correction produced from the second memory and perform the convergence correction.

The digital convergence correction system of the present invention can solve the problem that the convergence of the screen is shattered during the convergence correction, by processing in time division techniques the time for reading out of/writing into SRAM unit and the time for producing the data of convergence correction, and reconstruct a test pattern and a data map of SRAM unit along with the generation of addresses adequate for the multi-mode whereby the inventive system can cope with new mode conversion without any reconstruction of hardware.

The preferred embodiment of the present invention is given by way of example, and the invention recited in the attached claims is not limited to the illustrative embodiment. Those of ordinary skill in the art will recognize that routine design changes may be made to the exemplary embodiments without departing from the scope of the claims.

What is claimed is:

1. A digital convergence correction system comprising:
    a first memory part for storing adjustment point data for multi-nodes;
    a second memory part for storing convergence correction data in accordance with the adjustment point data;
    a control part for producing the convergence correction data using the adjustment point data stored in the first memory part for writing the convergence correction data on the second memory part and outputting the convergence correction data in the second memory part; and
    a time sharing processing unit for controlling the control part to share time in producing the convergence correction data and renewing convergence correction data in the second memory part and outputting the convergence correction data stored already in the second memory part for preventing overlap of the producing and storing time and the outputting time,
    wherein the second memory part includes a plurality of static RAMs (SRAMs) connected in parallel.

2. The digital convergence correction system as set forth in claim 1, further comprising a test pattern part for generating data on test patterns and cursors for multiple modes.

3. The digital convergence correction system as set forth in claim 2, wherein the test pattern part includes a test pattern controller for applying data for generating test patterns and cursors of multiple modes in the test pattern generator to the test pattern generator.

4. The digital convergence correction system as set forth in claim 1, further comprising a data outputting part for outputting correction data written through the time-sharing processing part.

5. The digital convergence correction system as set forth in claim 4, wherein the data outputting part includes a data conversion unit for digitizing the convergence correction data from the second memory part, a digital/analog convertor for converting digital data from the data conversion unit into an analog signal, a low pass filter for waveform shaping the analog signal from the digital/analog converter, an amplifier for amplifying the adjustment point data waveform shaped through the low pass filter, and a convergence yoke for controlling current for each of the adjustment points using the amplified adjustment point data.

6. The digital convergence correction system as set forth in claim 1, wherein the first memory part includes an electrically erasable and programmable ROM in storage of the adjustment point data for multi-modes.

7. A digital convergence correction system comprising:

- a first memory part for storing adjustment point data for multiple modes;
- a second memory part for storing convergence correction data in accordance with the adjustment point data;
- a control part for producing the convergence correction data using the adjustment point data stored in the first memory part for writing the convergence correction data on the second memory part and outputting the convergence correction data in the second memory part; and
- a time sharing processing unit for controlling the control part to share time in producing the convergence correction data and renewing convergence correction data in the second memory part and outputting the convergence correction data stored already in the second memory part for preventing overlap of the producing and storing time and the outputting time, wherein the control part includes a central processing unit for reading-in data from the first memory part for producing convergence correction data for an entire screen and for writing the convergence data on the second memory part, a PLL unit for producing a master clock using a horizontal blanking signal applied externally, an address generator for producing an address for accessing to the second memory for the convergence correction data using both the master clock from the PLL unit and a vertical blanking signal applied externally, and an address controller for controlling the address generator to generate addresses matched to a required mode in response to a control signal from the central processing unit in multiple modes.

* * * * *